United States Patent
Hofer et al.

[11] 3,886,156
[45] May 27, 1975

[54] O-(4-METHYL-5-METHYLMERCAPTOPYRIMIDIN-6-YL)(THIONO)-PHOSPHORIC(PHOSPHONIC) ACID ESTERS OR ESTER AMIDES

[75] Inventors: Wolfgang Hofer, Wuppertal-Elberfeld; Ingeborg Hammann, Cologne; Bernhard Homeyer, Opladen; Wilhelm Stendel, Wuppertal-Elberfeld, all of Germany

[73] Assignee: Bayer Aktiengesellschaft, Leverkusen, Germany

[22] Filed: Aug. 28, 1972

[21] Appl. No.: 284,379

[30] Foreign Application Priority Data
Sept. 4, 1971 Germany............................ 2144392

[52] U.S. Cl. ... 260/251 P; 260/251 R; 260/256.5 R; 424/200
[51] Int. Cl. ............................................ C07d 51/40
[58] Field of Search... 260/256.4 E, 251 P, 256.5 R, 260/251 R

[56] References Cited
UNITED STATES PATENTS
2,754,243   7/1956   Gysin et al........................ 167/33
3,657,247   4/1972   Freeman et al............. 260/256.5 R Primary Examiner—Donald G. Daus
Assistant Examiner—Raymond V. Rush
Attorney, Agent, or Firm—Burgess, Dinklage & Sprung

[57] ABSTRACT

O-[4-methyl-5-methylmercaptopyrimidin-6-yl]-(thiono)-phosphoric(phosphonic) acid esters or ester amides of the formula:

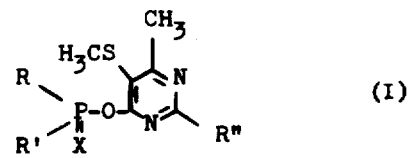

in which:
R is an alkyl, alkoxy or alkylamino radical with 1 to 6 carbon atoms,
R' is alkoxy with 1 to 6 carbon atoms,
R" is lower alkyl or alkylmercapto, and
X is oxygen or sulfur,
which possess insecticidal, acaricidal, nematocidal, rodenticidal and fungicidal properties.

7 Claims, No Drawings

O-(4-METHYL-5-METHYLMERCAPTOPYRIMIDIN-6-YL)(THIONO)-PHOSPHORIC(PHOSPHONIC) ACID ESTERS OR ESTER AMIDES

The present invention relates to and has for its objects the provision of particular new 0-[4-methyl-5-methylmercaptopyrimidin-6-yl]-(thiono)-phosphoric(phosphonic) acid esters or ester amides, i.e., 0,0-dialkyl-0-[2-alkyl- or -alkylmercapto-4-methyl-5-methylmercaptopyrimidin-6-yl] phosphoric acid esters, their ester amide counterparts, their thiono counterparts and the alkanephosphonic acid ester counterparts, which possess insecticidal, acaricidal, nematocidal, rodenticidal and fungicidal properties, active compositions in the form of mixtures of such compounds with solid and liquid dispersible carrier vehicles, and methods for producing such compounds and for using such compounds in a new way especially for combating pests, e.g. insects, acarids, nematodes, rodents and fungi, with other and further objects becoming apparent from a study of the within specification and accompanying examples.

It is known from German Patent Specification No. 910,652 that 0,0-dialkyl-0-pyrimidyl-(thiono)-phosphoric acid esters, for example 0,0-diethyl-0-[2-methylthio- (Compound A) or ethylthio-6-methyl-pyrimidyl(4)]-thionophosphoric acid ester (Compound B), exhibit insecticidal and acaricidal properties.

The present invention provides, as new compounds, the 0-pyrimidyl(thiono)-phosphoric(phosphonic) acid esters and ester amides of the formula:

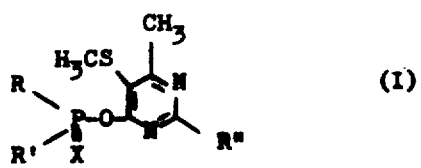

(I)

in which:
R is an alkyl, alkoxy or alkylamino radical with 1 to 6 carbon atoms,
R' is alkoxy with 1 to 6 carbon atoms,
R'' is lower alkyl or alkylmercapto, and
X is oxygen or sulfur.

In the foregoing formula, preferably R is a straight-chain or branched lower alkyl, alkoxy or monoalkylamino radical with 1 to 4 carbon atoms; R' is a straight-chain or branched lower alkoxy with 1 to 4 carbon atoms; and R'' is methylmercapto, methyl, ethyl or n- or isopropyl.

Surprisingly, the 0-pyrimidyl(thiono)-phosphoric(-phosphonic) acid esters and ester amides according to the invention show a higher insecticidal, especially soil-insecticidal, and acaricidal activity than previously known compounds. Moreover, a number of the compounds exhibit fungicidal, rodenticidal and nematocidal activity. The compounds according to the invention therefore represent a genuine enrichment of the art.

The present invention also provides a process for the preparation of an 0-pyrimidyl(thiono)-phosphoric(-phosphonic) acid ester or ester amide of the formula (I), in which a pyrimidine derivative of the general formula:

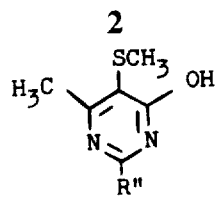

(II)

in which:
R'' has the meaning stated above, is reacted, in the form of an alkali metal, alkaline earth metal or ammonium salt thereof or in the presence of an acid-binding agent, with a (thiono)-phosphoric(phosphonic) acid ester halide or ester amide halide of the general formula:

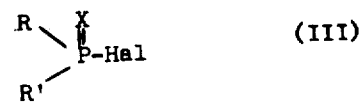

(III)

in which:
R, R' and X have the meanings stated above and
Hal is halogen, preferably chlorine.

If 0,0-diethylthionophosphoric acid ester chloride and 2,5-dimethylmercapto-4-methyl-6-hydroxypyrimidine are used as starting materials, the reaction course can be represented by the following equation:

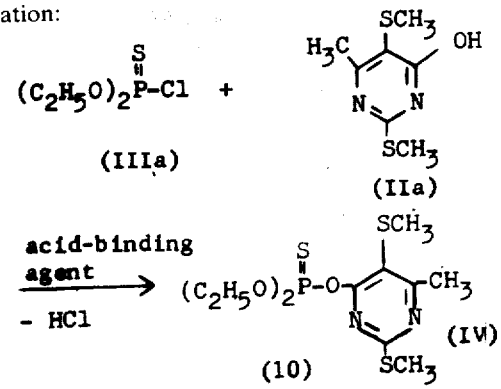

The pyrimidine derivatives of the formula (II) required as starting materials can be prepared according to known methods, for example by the reaction of acetamidinium chloride with 2-methylmercaptoacetoacetic acid ester (see H. Brintzinger et al., Chemische Berichte 1954, Vol. 87, page 325) in the presence of an alcoholate, in which there takes place a condensation, with cyclization, which leads to the pyrimidine derivative of the formula (II) as follows:

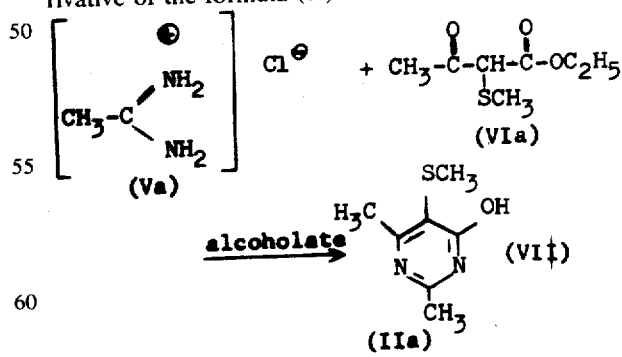

As examples of the pyrimidine derivatives of the formula (II), there may be mentioned:
2-methyl-, 2-ethyl-, 2-n-propyl, 2-isopropyl- and 2-methylmercapto-4-methyl-5-methylmercapto-6-hydroxypyrimidines.

As examples of the (thiono)-phosphoric(phosphonic) acid ester halides, ester amide halides of the formula (III), there may be mentioned:

O,O-dimethyl-, O,O-diethyl-, O,O-di-n-propyl-, O,O-diisopropyl-, O,O-di-n-butyl-, O,O-di-sec.-butyl-, O,O-di-isobutyl-, O-methyl-O-ethyl-, O-methyl-O-n-propyl-, O-methyl-O-isopropyl-, O-methyl-O-n-butyl-, O-methyl-O-sec.-butyl-, O-methyl-O-isobutyl-, O-methyl-O-tert.-butyl-, O-ethyl-O-n-propyl-, O-ethyl-isopropyl-, O-ethyl-O-butyl- and O-isopropyl-O-butylphosphoric acid ester chlorides and their thiono analogues;

O-methyl-, O-ethyl-, O-n-propyl-, O-isopropyl-, O-n-butyl-, O-isobutyl-, O-tert.-butyl- and O-sec.-butyl-methane-, ethane-, propane-, and butane- phosphonic acid ester chlorides and their thiono analogues; and O,N-dimethyl-, O,N-diethyl-, O,N-di-isopropyl-, O,N-di-n-propyl-, propyl-, O,N-di-n-butyl-, O,N-di-isobutyl-, O,N-di-sec.-butyl-, O-methyl-N-ethyl-, O-methyl-N-isopropyl-, O-methyl-N-butyl-, O-ethyl-N-isopropyl- and O-iso-propyl-N-ethylphosphoric acid ester amide chlorides and their thiono analogues.

The preparative process is preferably carried out with the use of a suitable solvent or diluent. As such, practically all inert organic solvents are suitable, especially aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, for example acetone, methyl ethyl ketone, methyl isopropyl ketone and methyl isobutyl ketone; and nitriles, such as acetonitrile and propionitrile.

As the acid-binding agent any customary acid acceptor can be used. particularly good results have been obtained with alkali metal carbonates and alcoholates, such as sodium or potassium carbonate, methylate or ethylate, as well as with aliphatic, aromatic and heterocyclic amines, for example triethylamine, dimethylaniline, dimethylbenzylamine or pyridine.

The reaction temperature can be varied within a fairly wide range. In general, the work is carried out at about 20° to 120°C, preferably at about 50° to 80°C.

The reaction is, in general, carried out at normal pressure.

For the carrying out of the process, the starting materials are in most cases used in equimolar amounts. An excess of either reactant brings no substantial advantages. The reaction is preferably carried out in the presence of one of the solvents mentioned above, and in the presence of an acid acceptor, at the stated temperatures, and the reaction mixture, after several hours stirring — optionally with heating — is worked up in a customary manner.

The compounds according to the invention are obtained in most cases in the form of colorless to slightly colored oils which cannot be distilled without decomposition but can, however, by so-called "slight distillation," that is by prolonged heating at moderately elevated temperatures under reduced pressure, be freed from the last volatile components and in this way be purified. For their characterization, the refractive index is particularly suitable. The products that are obtained in crystalline form are generally characterized by their melting points.

As already mentioned, the O-pyrimidyl-(thiono)-phosphoric(phosphonic) acid esters and ester amides of this invention are distinguished by an outstanding insecticidal, especially soil-insecticidal, and acaricidal effectiveness against crop pests, pests harmful to health and pests of stored products. They possess a good activity against both sucking and biting insects and mites (Acarina). At the same time they exhibit a low phytotoxicity and a number of them also exhibit nematocidal, rodenticidal and fungicidal properties.

For these reasons, the compounds according to the invention may be used with success as pesticides in crop protection and the protection of stored products, as well as in the hygiene and veterinary field.

To the sucking insects there belong, in the main, aphids (Aphididae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolum castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*;

further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acarina) there are classed, in particular, the spider mites (Tetranychidae) such as the two-spotted spider mite (*Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against pests harmful to health and pests of stored products, particularly flies and mosquitoes, the compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, gylcol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, nematocides, rodenticides and fungicides, or bactericides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, nematodes, rodents and fungi, and more particularly methods of combating at least one of insects and acarids, which comprise applying to at least one of correspondingly (a) such insects, (b) such acarids, (c) such nematodes, (d) such rodents, (e) such fungi, and (f) the corresponding habitat thereof, i.e., the locus to be protected, a correspondingly combative or toxic amount, i.e., an insecticidally, acaricidally, nematocidally, rodenticidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Drosophila test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

1 cc of the preparation of the active compound is applied with a pipette to a filter paper disc of 7 cm diameter. The wet disc is placed in a glass vessel containing 50 vinegar flies (*Drosophila melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from Table 1:

Table 1

Drosophila test

| Active Compounds | Concentration of active compound in % by weight | Degree of destruction in % after 1 day |
|---|---|---|
| (A) (known) $(C_2H_5O)_2P(=S)-O-\text{pyrimidine with } CH_3 \text{ and } SCH_3$ | 0.1<br>0.01<br>0.001<br>0.0001 | 100<br>100<br>98<br>0 |
| (B) (known) $(C_2H_5O)_2P(=S)-O-\text{pyrimidine with } CH_3 \text{ and } SC_2H_5$ | 0.1<br>0.01<br>0.001<br>0.0001 | 100<br>100<br>50<br>0 |
| $(C_2H_5O)_2P(=S)-O-\text{pyrimidine with } SCH_3, CH_3 \text{ and } CH(CH_3)_2$ | 0.1<br>0.01<br>0.001<br>0.0001 | 100<br>100<br>100<br>100 |

EXAMPLE 2

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 2:

EXAMPLE 3

Tetranychus test/resistant

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0%

Table 2

Plutella test

| Active Compounds | Concentration of active compound in % by weight | Degree of destruction in % after 3 days |
|---|---|---|
| (A) (known) $(C_2H_5O)_2\overset{S}{\underset{\parallel}{P}}-O-$ [pyridine ring with $CH_3$ and $SCH_3$] | 0.1<br>0.01 | 100<br>0 |
| (3) $C_2H_5\diagdown\overset{S}{\underset{\parallel}{P}}-O-$ / $C_2H_5O\diagup$ [pyridine ring with $SCH_3$, $CH_3$, $CH_3$] | 0.1<br>0.01 | 100<br>70 |
| (10) $(C_2H_5O)_2\overset{O}{\underset{\parallel}{P}}-O-$ [pyridine ring with $SCH_3$, $CH_3$, $SCH_3$] | 0.1<br>0.01 | 100<br>100 |
| (14) $C_2H_5\diagdown\overset{S}{\underset{\parallel}{P}}-O-$ / $C_2H_5O\diagup$ [pyridine ring with $SCH_3$, $CH_3$, $SCH_3$] | 0.1<br>0.01 | 100<br>100 |
| (9) $(C_2H_5O)_2\overset{O}{\underset{\parallel}{P}}-O-$ [pyridine ring with $SCH_3$, $CH_3$, $CH(CH_3)_2$] | 0.1<br>0.01 | 100<br>100 |

Table 2 (continued)

Plutella test

| Active Compounds | Concentration of active compound in % by weight | Degree of destruction in % after 3 days |
|---|---|---|
| (11) $(C_2H_5O)_2\overset{S}{\underset{\|}{P}}-O-$ [pyrimidine with $SCH_3$, $CH_3$, $CH(CH_3)_2$] | 0.1<br>0.01<br>0.001 | 100<br>100<br>75 |
| (13) $\begin{matrix}C_2H_5\\C_2H_5O\end{matrix}\overset{S}{\underset{\|}{P}}-O-$ [pyrimidine with $SCH_3$, $CH_3$, $CH(CH_3)_2$] | 0.1<br>0.01<br>0.001 | 100<br>100<br>60 |
| (16) $\begin{matrix}CH_3O\\i\text{-}C_3H_7\text{-}NH\end{matrix}\overset{S}{\underset{\|}{P}}-O-$ [pyrimidine with $SCH_3$, $CH_3$, $CH(CH_3)_2$] | 0.1<br>0.01 | 100<br>70 | means that none of the spider mites are killed.

The active compounds, the concentrations of the active compounds, the evaluation times and the results can be seen from the following Table 3:

Table 3

(Tetranychus test/resistant)

| Active Compounds | Concentration of active compound in % by weight | Degree of destruction in % after 2 days |
|---|---|---|
| (A) (known) $(C_2H_5O)_2\overset{S}{\underset{\|}{P}}-O-$ [pyrimidine with $CH_3$, $SCH_3$] | 0.1 | 0 |
| (B) (known) $(C_2H_5O)_2\overset{S}{\underset{\|}{P}}-O-$ [pyrimidine with $CH_3$, $SC_2H_5$] | 0.1 | 20 |
| (5) $\begin{matrix}C_2H_5O\\CH_3\text{-}NH\end{matrix}\overset{S}{\underset{\|}{P}}-O-$ [pyrimidine with $SCH_3$, $CH_3$, $CH_3$] | 0.1 | 98 |

Table 3 (continued)

(Tetranychus test/resistant)

| Active Compounds | Concentration of active compound in % by weight | Degree of destruction in % after 2 days |
|---|---|---|
| (10) 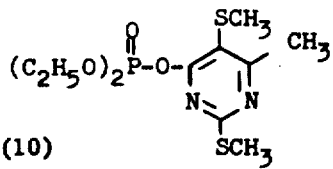 | 0.1 | 95 |
| (9) 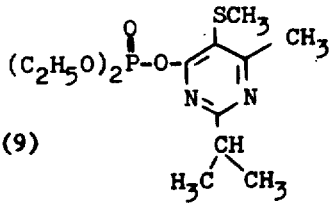 | 0.1 | 98 |
| (13) 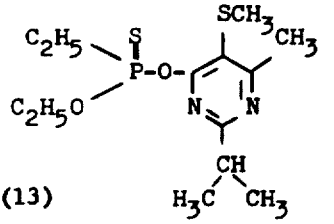 | 0.1 | 98 |
| (16) 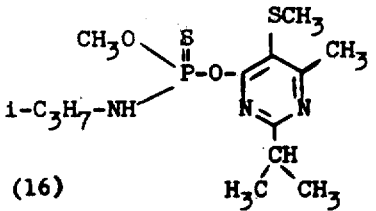 | 0.1 | 100 |

EXAMPLE 4

Myzus test (resistant) (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 4:

Table 4
(Myzus persicae/resistant)

| Active Compounds | | Concentration of active compound in % by weight | Degree of destruction in % after 1 day |
|---|---|---|---|
| 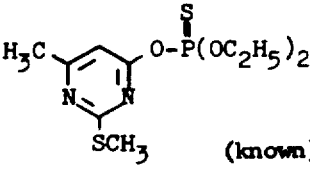 (known) | (A) | 0.1<br>0.02<br>0.004<br>0.0008 | 100<br>95<br>35<br>13 |
| 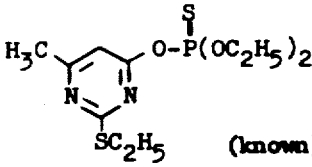 (known) | (B) | 0.1<br>0.02<br>0.004<br>0.0008 | 100<br>95<br>40<br>5 |
| 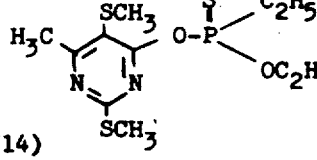 (14) | | 0.1<br>0.02<br>0.004<br>0.0008 | 100<br>100<br>90<br>35 |
| 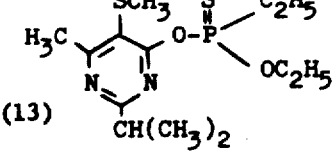 (13) | | 0.1<br>0.02<br>0.004<br>0.0008 | 100<br>100<br>95<br>45 |

EXAMPLE 5

Phorodon test (contact action)
Solvent: 3 parts by weight acetone
Emulsifier: 1 part by weight alkylarylpolyglycol ether
To produce a suitable preparation of active compound, 1 part by weight of the active compound is mixed with the stated amount of solvent containing the stated amount of emulsifier, and the concentrate is diluted with water to the desired concentration.

Hop plants (*Humulus lupulus*) which have been heavily infested with the hop aphid (*Phorodon humuli*) are sprayed with the preparation of the active compound until dripping wet.

After the specified periods of time, the degree of destruction is determined as a percentage: 100% means that all the aphids were killed; 0% means that none of the aphids were killed.

The active compounds, the concentrations of the active compounds, the evaluation times and the results can be seen from the following Table 5:

Table 5
Phorodon humuli/normally sensitive

| Active Compounds | | Concentration of active compound in % by weight | Degree of destruction in % after 1 day |
|---|---|---|---|
| 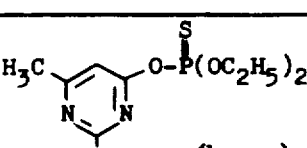 (known) | (A) | 0.02<br>0.004<br>0.0008<br>0.00016<br>0.000032 | 100<br>100<br>100<br>99<br>5 |
| 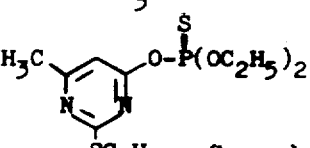 (known) | (B) | 0.02<br>0.004<br>0.0008<br>0.00016<br>0.000032 | 100<br>100<br>100<br>100<br>10 |
| 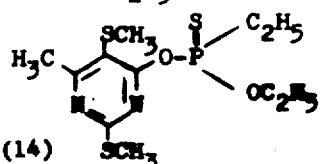 (14) | | 0.02<br>0.004<br>0.0008<br>0.00016<br>0.000032 | 100<br>100<br>100<br>100<br>98 |

Table 5

Phorodon humuli/normally sensitive

| Active Compounds | Concentration of active compound in % by weight | Degree of destruction in % after 1 day |
|---|---|---|
| (13) [structure: H₃C, SCH₃, pyrimidine with O-P(=S)(OC₂H₅)(C₂H₅), CH(CH₃)₂] | 0.02<br>0.004<br>0.0008<br>0.00016<br>0.000032 | 100<br>100<br>100<br>100<br>90 |

EXAMPLE 6

Critical concentration test/soil insects

Test insect: cabbage root fly maggots (*Phorbia brassicae*)
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg/l), is decisive. The soil is filled into pots and the pots are left to stand at room temperature. After 24 hours, the test insects are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 6:

Table 6—Continued

Phorbia brassicae/maggots in the soil

| Active Compounds | Degree of destruction in % with a concentration of active compound of | | | | |
|---|---|---|---|---|---|
| | 20 | 10 | 5 | 2.5 | 1.25 ppm |
| (11) [structure: (C₂H₅O)₂P(=S)-O-pyrimidine with SCH₃, CH₃, CH(CH₃)₂] | 100 | 100 | 100 | 98 | 50 |
| (14) [structure: C₂H₅, C₂H₅O, P(=S)-O-pyrimidine with SCH₃, CH₃, SCH₃] | 100 | 100 | 98 | 95 | 20 |

Table 6

Phorbia brassicae/maggots in the soil

| Active Compounds | Degree of destruction in % with a concentration of active compound of | | | | | |
|---|---|---|---|---|---|---|
| | 20 | 10 | 5 | 2.5 | 1.25 | ppm |
| 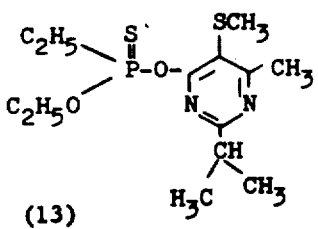 (13) | 100 | 100 | 95 | 50 | – | |
| 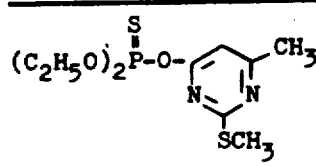 (A) (known) | 100 | 98 | 50 | 0 | | |

EXAMPLE 7

Test with parasitizing fly larvae

Solvent: 35 parts by weight ethyleneglycol-monomethyl ether.

Emulsifier: 33 parts by weight nonylphenolpolyglycol ether.

To produce a suitable preparation of active compound, 30 parts by weight of the active substance concerned is mixed with the stated amount of solvent which contains the above mentioned proportion of emulsifier, and the concentrate so obtained is diluted with water to the desired concentration.

About 20 fly larvae (*Lucilia cuprina*) are put into a test-tube which contains about 1 cc of horse musculature. 0.5 ml of the preparation of active compound are applied to this horseflesh. After 24 hours, the degree of destruction is determined as a percentage. 100% means that all, 0% that no, larvae have been killed.

The active compound tested, the concentration applied and the test results obtained can be seen from Table 7:

Table 7

Test with parasitizing fly larvae

| Active Compound | Concentration of active compound in ppm | Degree of destruction in % (*Lucilia cuprina*) |
|---|---|---|
| 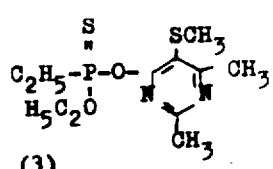 (3) | 300<br>30 | 100<br>100 |
| 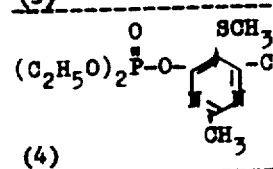 (4) | 300<br>30<br>3 | 100<br>100<br><50 |
| 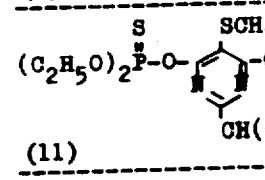 (11) | 300<br>30 | 100<br>100 |

Table 7-Continued

Test with parasitizing fly larvae

| Active Compound | Concentration of active compound in ppm | Degree of destruction in % (Lucilia cuprina) |
|---|---|---|
| 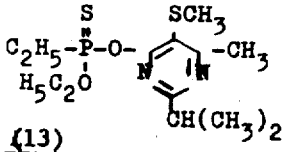 (13) | 300<br>100<br>30<br>10 | 100<br>100<br>100<br>100 |
| 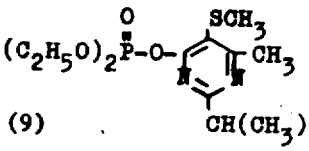 (9) | 300<br>30 | 100<br>100 |

The process of the invention is illustrated in and by the following preparative examples.

EXAMPLE 8

A. Preparation of the pyrimidine derivatives required as starting materials can be effected, for example, as follows:

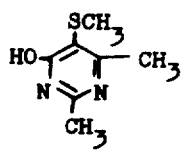 (IIb)

47 g (0.5 mole) of acetamidinium chloride are introduced into a solution of 27 g (0.5 mole) of sodium methylate in 500 ml of methanol. 88 g (0.5 mole) of 2-methylmercaptoacetoacetic acid ester are subsequently added dropwise to the reaction mixture and the latter is stirred for 4 hours at 60°–70°C. Thereafter, the mixture is evaporated to dryness under reduced pressure, the residue is dissolved while hot in 300 ml of water, and the solution is slightly acidified with a little acetic acid. After cooling to room temperature, the mixture is extracted twice with 200 ml of methylene chloride; the methylene chloride is drawn off under reduced pressure, and the residue is recrystallized from ligroin. There are obtained 39 g (46% of theory) of 2,4-dimethyl-5-methylmercapto-6-hydroxypyrimidine in the form of white crystals of the melting point 160°C.

The following compounds are obtainable in an analogous manner:

| Formula | Fp (°C) | Yield (% of theory) |
|---|---|---|
| 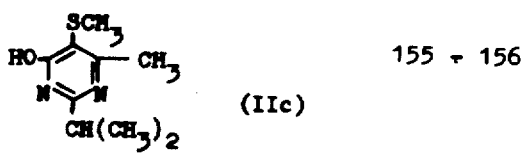 (IIc) | 155 – 156 | 44 |
| 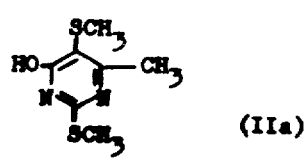 (IIa) | 202 | 35 |

Continued

| Formula | Fp (°C) | Yield (% of theory) |
|---|---|---| b)

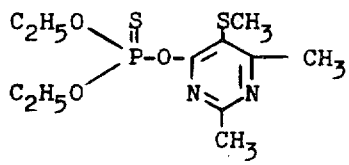
(1)

42.5 g (0.25 mole) of 2,4-dimethyl-5-methylmercapto-6-hydroxypyrimidine are dissolved in 200 ml of acetonitrile. 39 g (0.25 mole) of potassium carbonate are suspended in this solution; 47 g (0.25 mole) of 0,0-diethylthionophosphoric acid diester chloride are subsequently added dropwise at 70°C to the reaction mixture and the latter is stirred for 3 hours at 70°C. After suction filtration of the solid components the solvent is drawn off under reduced pressure. The residue is taken up in methylene chloride and the methylene chloride solution is washed with water. The organic phase is dried over sodium sulfate, the solvent is drawn off under reduced pressure, and the residue is "slightly distilled" at 0.1 mm Hg and 70°C. There remain behind 56 g (70% of theory) of 0,0-diethyl-0-[2,4-dimethyl-5-methylmercaptopyrimidin-6-yl]-thionophosphoric acid ester as a yellowish oil with a refractive index $n_D^{24}$ of 1.5276.

In an analogous manner, the following compounds can be prepared:

| Formula | Physical properties (melting point; Refractive index) | Yield % of theory |
|---|---|---|
| 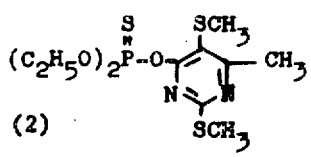 (2) | $n_D^{23} = 1.5610$ | 77 |
| 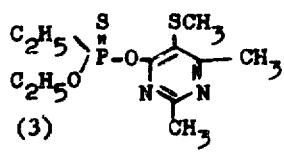 (3) | $n_D^{24} = 1.5382$ | 68 |
| 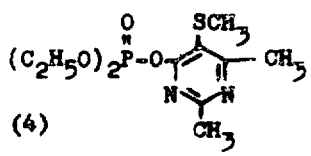 (4) | $n_D^{24} = 1.5075$ | 62 |
| 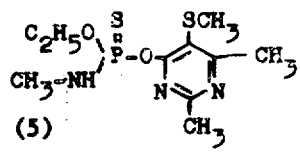 (5) | $n_D^{24} = 1.5512$ | 65 |
| 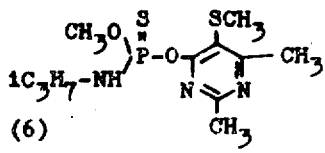 (6) | $n_D^{24} = 1.5361$ | 44 |

| Formula | Physical properties (melting point; Refractive index) | Yield % of theory |
|---|---|---|
| 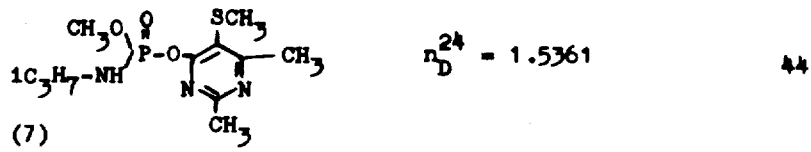 (7) | $n_D^{24} = 1.5361$ | 44 |
| 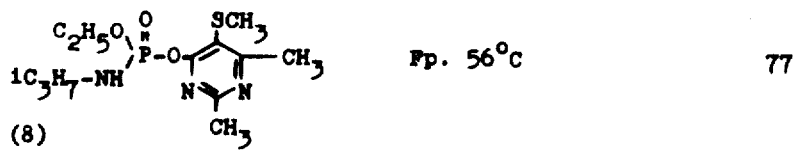 (8) | Fp. 56°C | 77 |
| 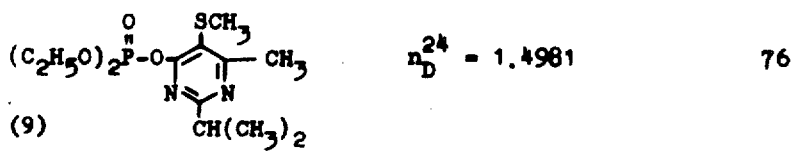 (9) | $n_D^{24} = 1.4981$ | 76 |
| 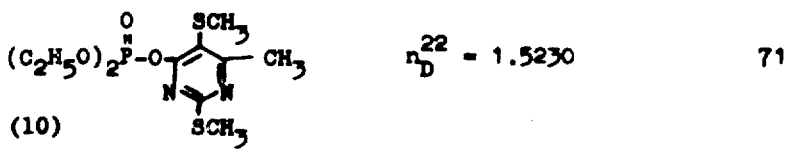 (10) | $n_D^{22} = 1.5230$ | 71 |
| 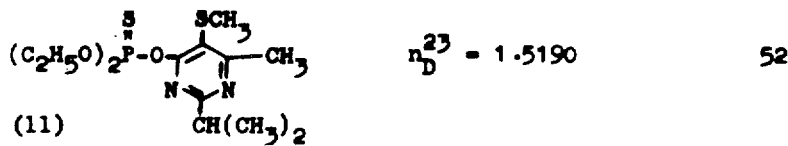 (11) | $n_D^{23} = 1.5190$ | 52 |
| 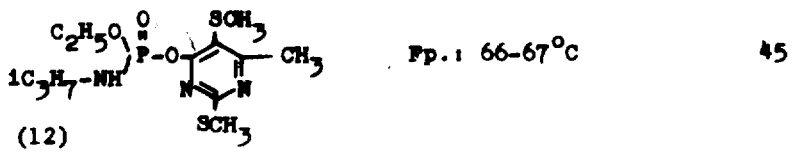 (12) | Fp.: 66-67°C | 45 |
| 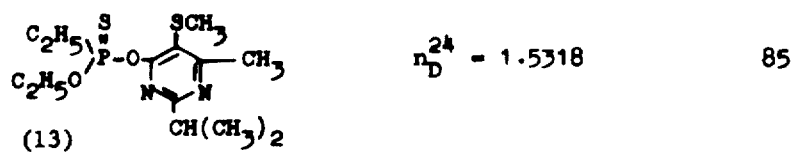 (13) | $n_D^{24} = 1.5318$ | 85 |
| 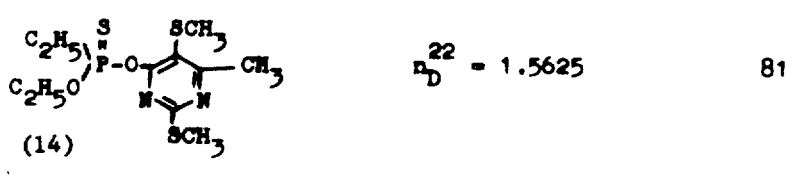 (14) | $n_D^{22} = 1.5625$ | 81 |

Continued

| Formula | Physical properties (melting point; Refractive index) | Yield % of theory |
|---|---|---|
| 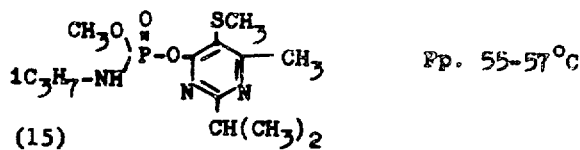 (15) | Fp. 55-57°C | 65 |
| 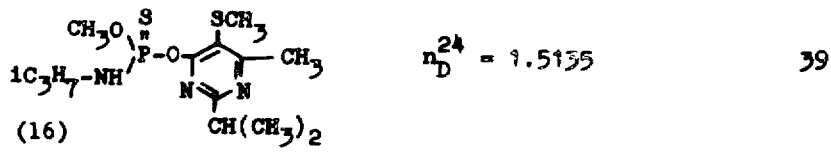 (16) | $n_D^{24}$ = 1.5135 | 39 |
| 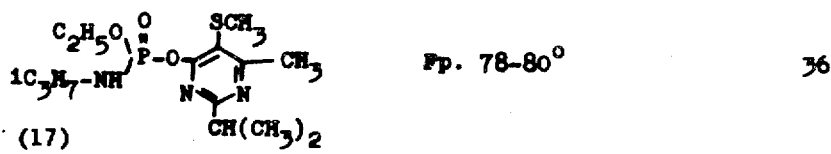 (17) | Fp. 78-80° | 36 |

It will be appreciated that the instant specification and examples are set forth by way of illustration and not limitation and that various modifications and changes may be made without departing from the spirit and scope of the present invention.

What we claim is:

1. An 0-pyrimidyl(thiono)-phosphoric(phosphonic) acid ester or ester amide of the formula:

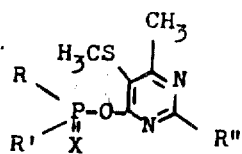

in which:
R is alkyl, alkoxy or alkylamino each with 1 to 6 carbon atoms,
R' is alkoxy with 1 to 6 carbon atoms,
R" is alkyl or alkylmercapto each with 1 to 3 carbon atoms, and
X is oxygen or sulfur.

2. A compound according to claim 1, in which R is alkyl, alkoxy or monoalkylamino each with 1 to 4 carbon atoms; R' is alkoxy with 1 to 4 carbon atoms; and R" is methylmercapto, methyl, ethyl or n- or isopropyl.

3. The compound according to claim 1 wherein such compound is 0,0-diethyl-0-[2-isopropyl-4-methyl-5-methylmercaptopyrimidin-6-yl]-phosphoric acid ester of the formula:

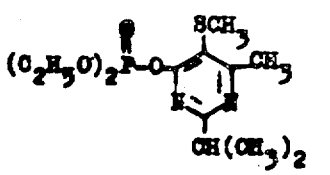

4. The compound according to claim 1 wherein such compound is 0,0-diethyl-0-[2,5-dimethylmercapto-4-methylpyrimidin-6-yl]-phosphoric acid ester of the formula:

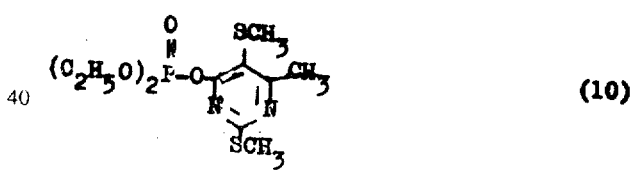 (10)

5. The compound according to claim 1 wherein such compound is 0,0-diethyl-0-[2-isopropyl-4-methyl-5-methylmercaptopyrimidin-6-yl]-thionophosphoric acid ester of the formula:

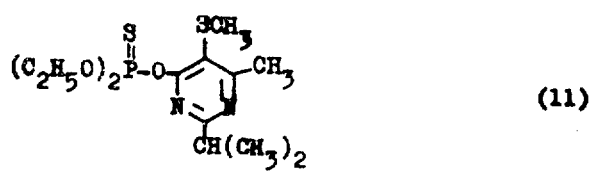 (11)

6. The compound according to claim 1 wherein such compound is 0-ethyl-0-[2-isopropyl-4-methyl-5-methylmercaptopyrimidin-6-yl]-ethanethionophosphonic acid ester of the formula:

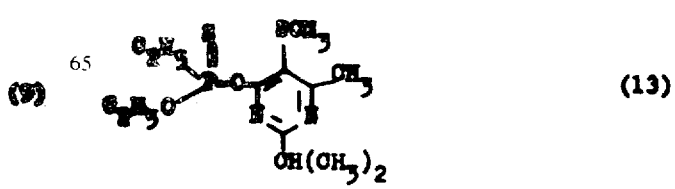 (13)

7. The compound according to claim 1 wherein such compound is 0-ethyl-0-[2,5-dimethylmercapto-4-methylpyrimidin-6-yl]-ethanethionophosphonic acid ester of the formula:
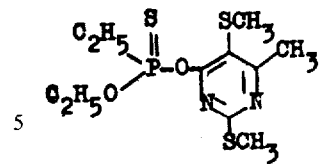
(14)